May 16, 1939. J. DU FOUR 2,158,224
TYPOGRAPHICAL SINGLE-TYPE COMPOSING MACHINE
Filed March 10, 1937   11 Sheets-Sheet 2
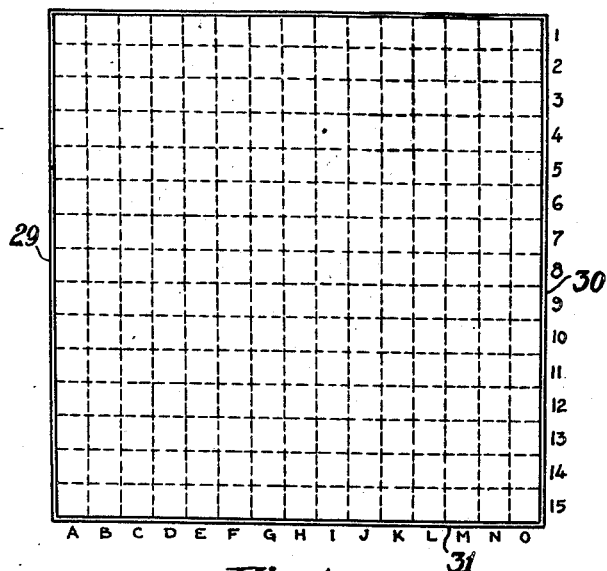
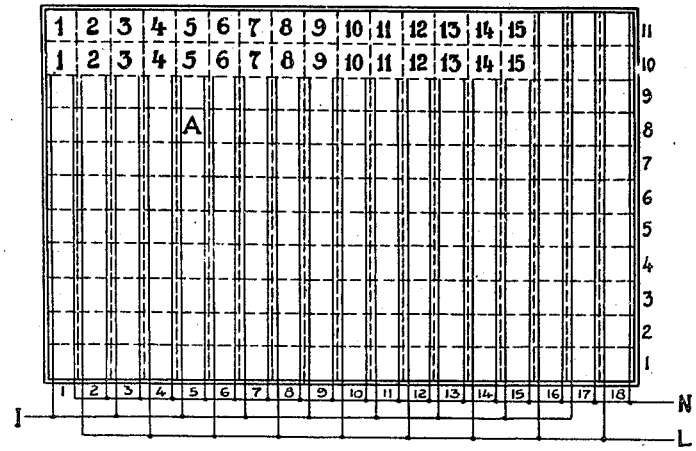
Inventor:
Jean Du Four

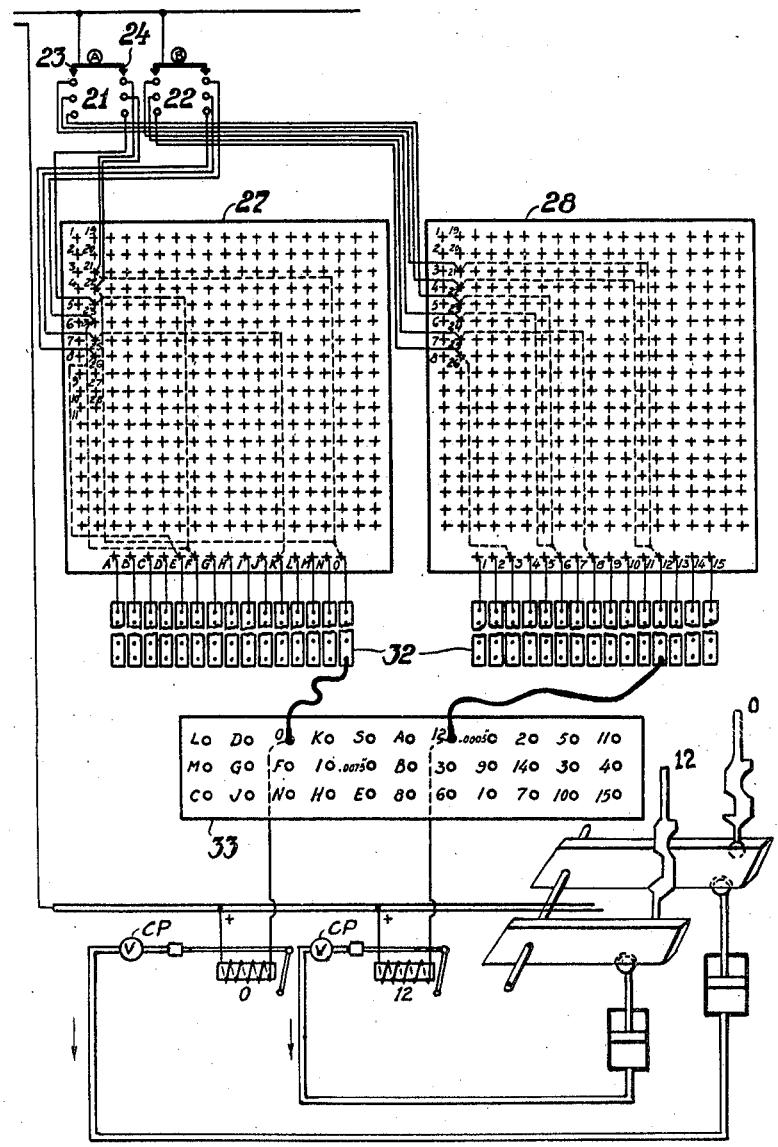

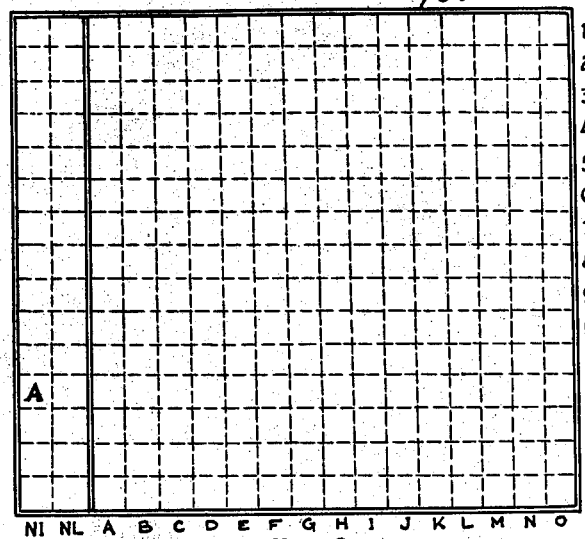

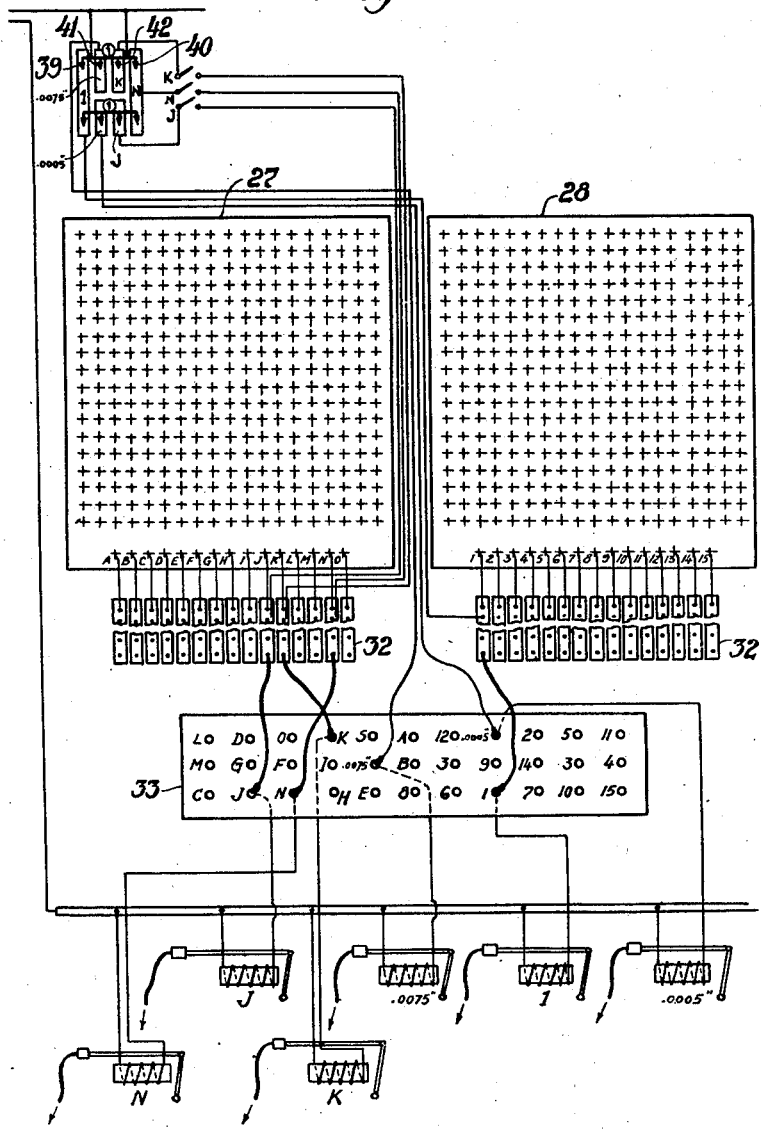

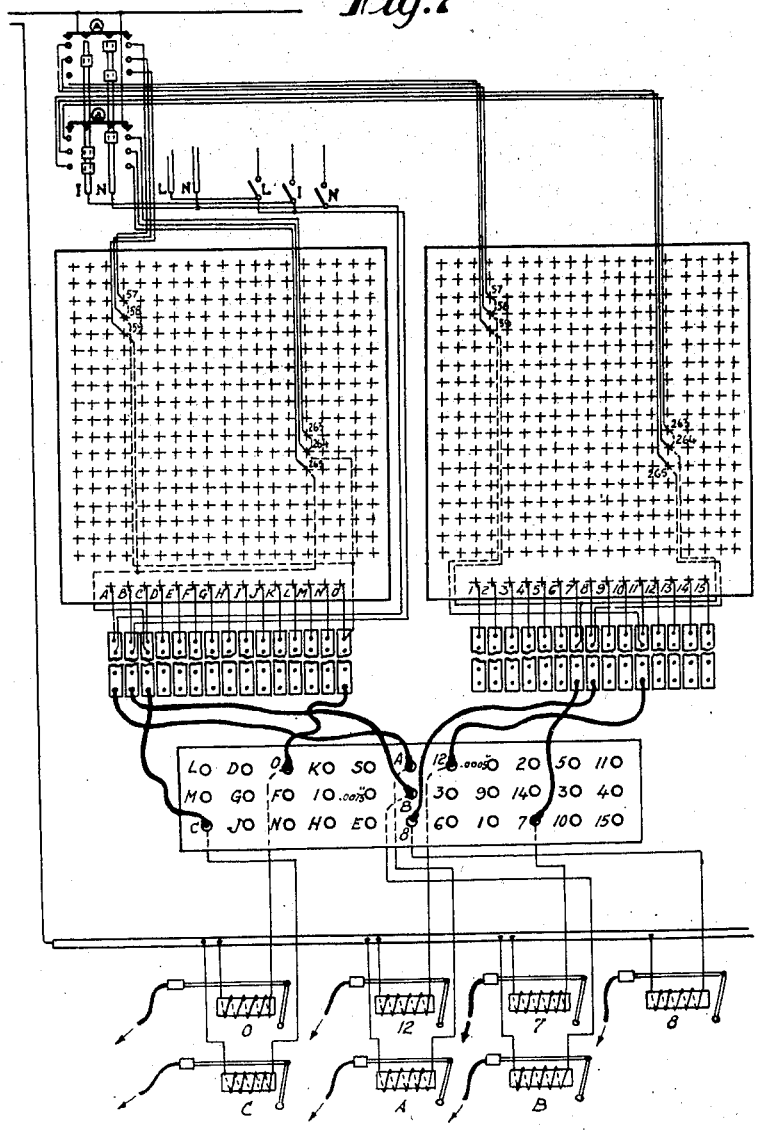

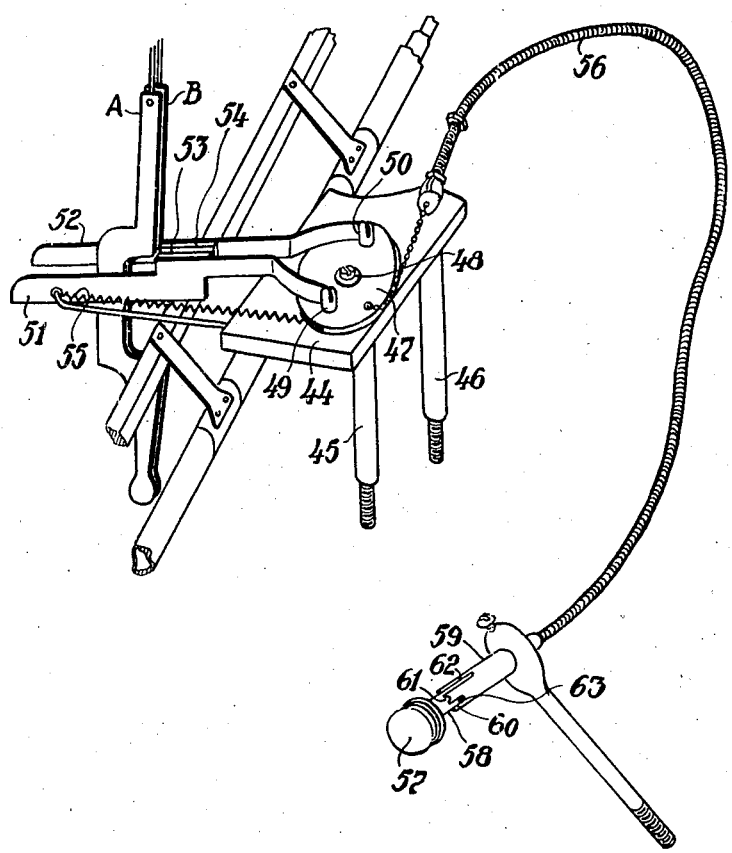

May 16, 1939. J. DU FOUR 2,158,224
TYPOGRAPHICAL SINGLE-TYPE COMPOSING MACHINE
Filed March 10, 1937 11 Sheets-Sheet 9
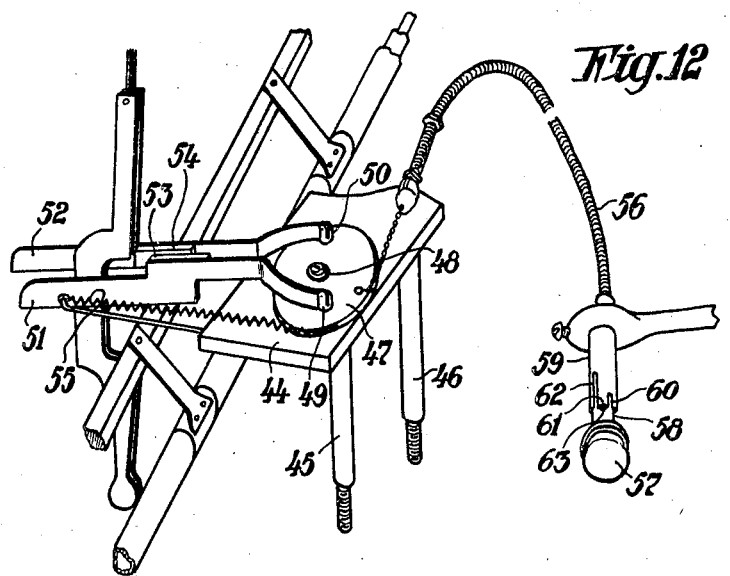
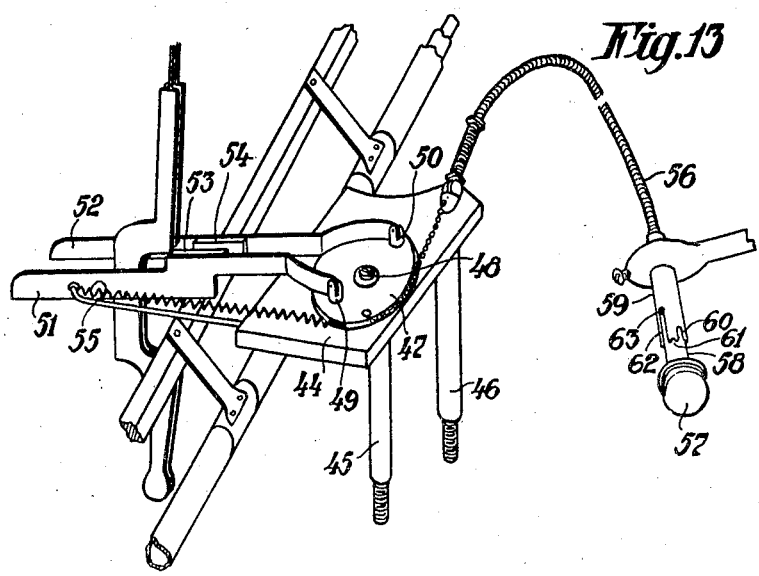

May 16, 1939.  J. DU FOUR  2,158,224
TYPOGRAPHICAL SINGLE-TYPE COMPOSING MACHINE
Filed March 10, 1937   11 Sheets-Sheet 11
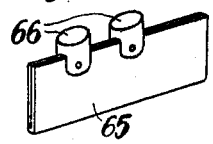
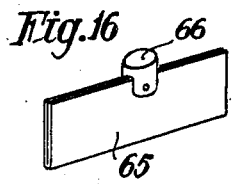
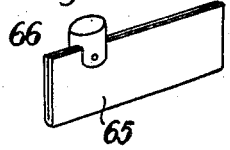
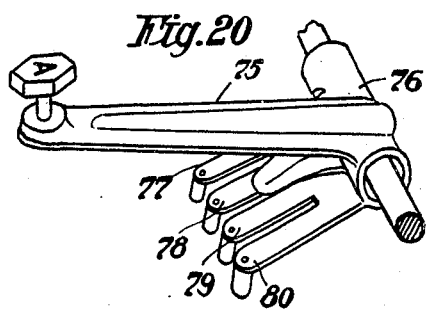
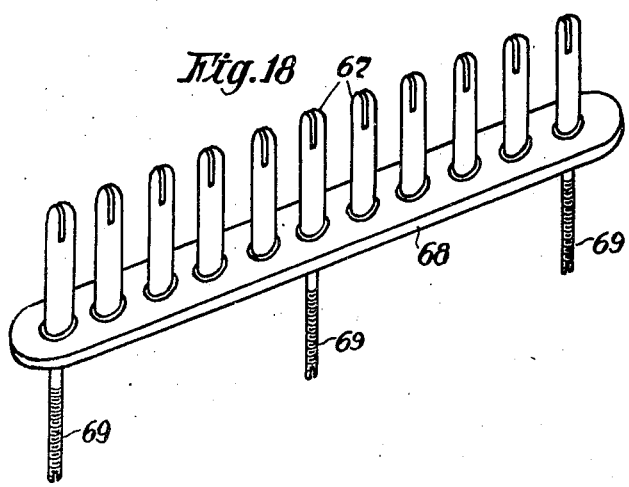
INVENTOR:
JEAN DU FOUR
PER,
ATTORNEY.

Patented May 16, 1939

2,158,224

UNITED STATES PATENT OFFICE 2,158,224

TYPOGRAPHICAL SINGLE-TYPE COMPOSING MACHINE

Jean du Four, Antwerp, Belgium

Application March 10, 1937, Serial No. 130,057
In Belgium March 10, 1936

14 Claims. (Cl. 164—113)

The invention relates to improvements in typographical composing machines, mainly to single-type composing and casting machines.

The improvements have mainly for object the operation of the pneumatic valves of the strip perforating machine by electromagnetic means.

The main advantages of such improvements relate to the reducing and simplifying of the mechanism required for composing any fount of type while an extraordinary speed is secured for modifying the alphabets and character signals to be used. In a secondary manner is secured a considerable reduction of the fatigue of the compositor and considerable facility is obtained for working on extended die-cases, composing with the spacing apparatus and the like.

The invention also relates to the composing of type intended to be printed in two colours.

A first improvement thus consists in opening the air valves by means of electromagnets working at low voltage.

This improvement directly permits to considerably reduce the stroke of the keys at the keybank. Indeed, this stroke being about 10 mm. on known keybanks, may be reduced to about 2 mm.

It results therefrom that the touching in the typing operation becomes extremely light and alive, the operator at the new keybank meeting practically with no resistance, whatever may be the number of perforations to be produced.

Furthermore, the area generally occupied by the ordinary keybanks is considerably reduced, owing to the fact that the new device only comprises two alphabets instead of five upon the known keybanks. This modification enables the operator to compose, for instance, italics, small capitals and bold type with the same keys as the roman type, and this undoubtedly produces a simplification and a considerable reduction of work at the key-board.

Moreover, the improvements provide for that, on the keybank, each character will always occupy the same place, whatever may be the position of the corresponding matrices in the matrix case of the casting machine.

The invention furthermore consists in the particular arrangement of the contact board and the keybank itself, and according to which the latter, by a single manipulation, can be moved and set in three different positions, which correspond to a well determined contact distribution. This has for result that the compositor has instantaneously at his disposal and without moving himself, three pairs of intermediaries, which bring under his control a very considerable number of different characters. This arrangement is particularly beneficial for the composing of bold type and generally for all character series comprising only capitals and lower-case type, which requires a special unit arrangement.

According to the invention, use will thus be made of one single keybank for all imaginable arrangements of the contacts. The keys will thus never undergo any change in their position, and thereby will be systematically eliminated a costly and cumbersome material which was necessary until now.

According to the invention, without any modification in the arrangement of the keys, the compositor passes instantaneously to the composing of most of the foreign languages. Thus he will be able to instantaneously go over to the composing from Dutch into French, into English, into German, into Spanish, into Portuguese, into Italian, etc., the new keybank comprising all the character signals and accents proper to the main idioms in use, and this as well for bold type, italics and small capitals, as for the lower-case and the capitals of the roman type.

In the combined arrangements of any bold type with ordinary type, such as, for instance, roman type and italics or small caps, the compositor has instantaneously at his disposal, besides the most usual typographical marks, six complete alphabets, and this for the composing in any language of those considered and without any change in the arrangement of the keys.

The keybar banks used at present become superfluous and are replaced by contact boards, however in considerably reduced number and fixed on the machine in a perfectly accessible manner.

It results from the improved arrangement that any possibility of mistake is radically excluded by passing from one intermediary to another, even when passing from one character-type to another in the same intermediary, the compositor having permanently at his sight luminous signals which automatically indicate the character used.

The invention also relates to the composing of type to be printed in two colours. For this purpose, a special mechanism has been provided, which is adapted to perform each supplementary perforation according to the colour of printing and in conformity with the new prescriptions in the casting machine, as will clearly appear from the description hereafter.

In order that the different characteristics of the invention may be well understood, a form of embodiment will be described hereafter in detail with reference to the accompanying drawings, in which:

Fig. 1 is a diagrammatic view of the electromagnetic arrangement with the air-valves, air-lines and punch mechanism.

Fig. 2 is a diagrammatic view of the known matrix case, given only by way of documentation.

Fig. 4 is an electric diagram of the new key-bank with the device for extended matrix case and composing in two colours.

Fig. 5 illustrates the diagram of a known extended die-case only given by way of documentation.

Fig. 6 is a diagrammatic view of an arrangement for composing by means of the spacing apparatus.

Fig. 7 is a diagrammatic view of the electromagnetic arrangement for the composing in two colours.

Figs. 8 and 9 illustrate the matrix cases used with the old method for the two-colour composing, these figures being only given by way of documentation.

Fig. 10 illustrates the arrangement of the keys used according to the invention.

Figs. 11, 12 and 13 illustrate, in perspective views, three distinct positions of a mechanism for the two-colour composing and capable of replacing the electromagnetic device shown in Fig. 7.

Figs. 15, 16 and 17 illustrate, in perspective views, the contact supports for movable contacts.

Fig. 18 illustrates, in perspective view, a strip of contact plugs.

Fig. 19 is a vertical radial section through a spring-controlled contact.

Fig. 20 is a perspective view of a key with its contact strips.

Figure 3:
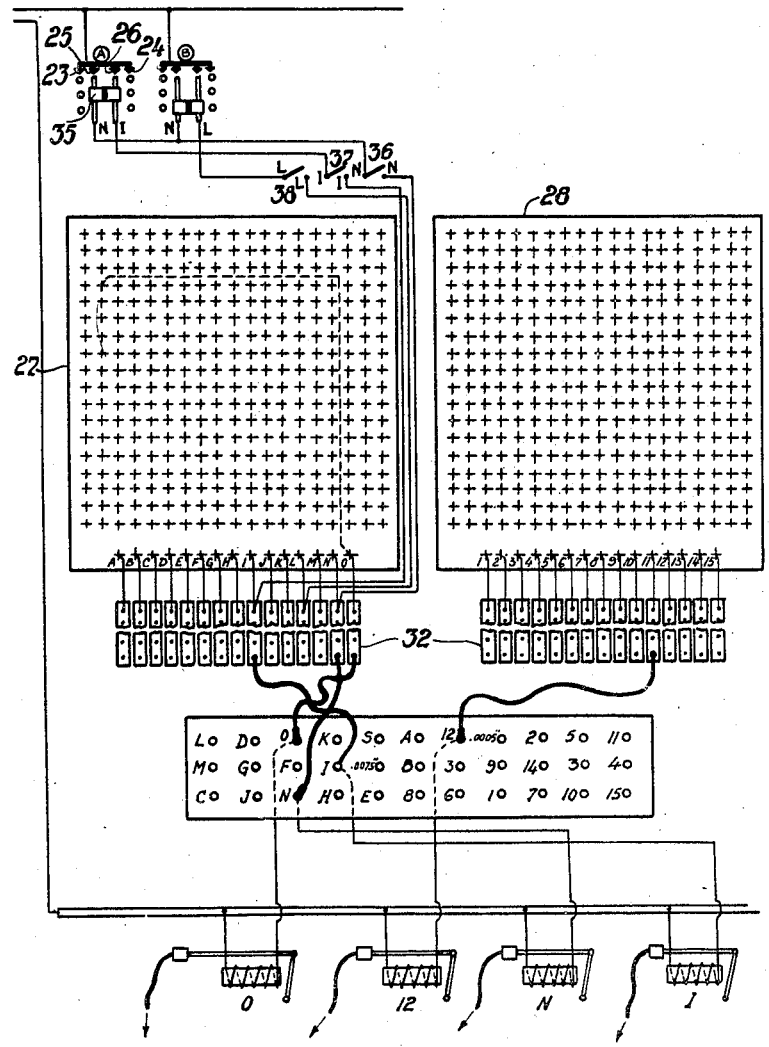
Fig. 3 is a diagrammatic view of an arrangement according to that of Fig. 1, but intended for working on extended matrix cases.

With reference to Fig. 1, the different circuits have been designated for one single key, the arrangement being repeated for each of the keys at the keybank. Therefore, according to the invention, the keybank comprises, in the example detailed hereafter, eleven rows of eighteen keys, constituting as a whole the keybank of the composing machine.

The latter is arranged in such a manner that, by the manipulation of an element, such as a handle, for instance, which is directly at hand for the operator, said keybank can be brought to three different positions in which it can be steadied.

Underneath the keybank are arranged contacts formed, in this case, by small masses of material which is a good conductor of electricity.

To each key correspond three pairs of contacts proper, corresponding respectively to each of the three particular positions which the keybank is adapted to take. In this way, the compositor has effectively a triple keybank at his disposal.

Fig. 1 diagrammatically illustrates two adjacent contact cases 21 and 22. Now, each key of the key-board is integral with four strips of a forked blade of steel, the strips being provided with four contacts 23, 24, 25 and 26 (Figs. 3 and 20); the two outer contacts 23, 24, enter into contact with the two terminals of a pair of the corresponding case, according to the position of the keybank of the perforating mechanism. These electric contacts between the strips of the keys and the terminals arranged underneath the keybank operate the closure of the electric circuit of electromagnets controlling the pneumatic valves of the strip perforating machine.

However, it is necessary to secure a convenient arrangement of all these contacts, for the purpose of permitting to produce the perforations in a much higher number of combinations than the number of keys at the key-board.

For this purpose, like for the mechanical arrangement and such as diagrammatically shown in Fig. 2, each matrix of the die-case 29 of the casting machine may be designated by two co-ordinates, practically determined by the two adjacent sides 30 and 31. One of these sides is numbered from 1 to 15, whereas the other one has references from A to O.

Thus each of the characters and marks of the matrix case will be identified by a symbol formed by the assemblage of a number and a letter.

For now producing at the casting machine the character A, for instance, it is required that, while pushing the key A at the key-board, electric connections are formed in such a manner that the corresponding electromagnets 12 and O each operate their pneumatic valve. Two perforations will thus be produced in the paper strip, and in the casting machine these perforations will produce the formation of the character A.

From this identification of characters it results that each of the rows and each of the columns in the division of the matrix case being common with a group of characters, the number of electromagnets may be reduced to the number of columns added to the number of rows dividing the matrix case.

While thus working with an ordinary matrix case, thirty electromagnets will be sufficient to operate a corresponding number of pneumatic valves and, by the fact, produce all the combinations of perforations required for producing any character of the key-board at the casting machine.

A main characteristic of the invention consists in the insertion of elements adapted to easily and efficiently perform these different combinations, so that by starting with a very considerable number of contacts at the keybank, only a small number of electrimagnets are required.

These particular elements are formed by distributor and selector boards adapted to judiciously assemble all the electric connections required for the operation of one and the same electromagnet.

In the example specified, the grouping of the electric connections is performed by means of two boards 27 and 28. Upon the first one are arranged all the electric connections corresponding to the matrix columns of the die-case with reference to from A to O, whereas the other board 28 will bear all the electric connections corresponding to the rows 1 to 15.

These two boards 27 and 28 constituting the "intermediaries" are arranged and embodied in a similar manner with respect to the structure of the contacts, their working and the grouping of common connections.

It should be noticed that from the two contacts of each pair upon the contact board, the one is connected to one of the boards or to one of the aforesaid "intermediaries", and the other to the second "intermediary".

In this way, all the terminals of one and the same column of the contact board will be united to one and the same "intermediary" and on one and the same face thereof.

Each of these "intermediaries" comprises contacts arranged so as to reproduce the matrices of the die-case 29, in such a manner that each terminal of the contact board will thus be connected to a spring-controlled contact passing through said board and projecting at the other face. Upon the latter, the different terminals are grouped and united to a common terminal by means of electric connections. This latter actually represents for each of the boards 27 and 28 respectively the row and the column common to the different terminals thus grouped.

Thus upon each of the "intermediaries" 27 and 28 have been grouped all the connections common to each row and to each column of the matrix case 29.

Each of these common terminals is brought in connection with a separate strip 32.

Finally, the installation is completed by a distributing board 33, formed by a contact board upon which are branched the different electromagnets actuating the pneumatic valves. Furthermore, to the same distributor 33 are connected the individual strips 32, in such a manner that this connection completes the circuit of the electromagnets each corresponding to one row or to one column of the matrix case.

Practically, it will be sufficient to perform the electric connection between the electromagnets and the connection boards by the provision of conductor cords, one end of which is fixed to the common strips 32, whereas the other end provided with a contact plug is introduced into the corresponding female contact of the distributor 33.

The contacts of the contact board are thus put in electric connection with the electromagnets, after a distribution and a grouping of all the electric connections, taking into account the position occupied in the matrix case by the character corresponding to the key which has been acted upon.

It will thus be understood that by lowering the key A, for instance, the circuit of the two relays 12 and O will be immediately closed, which relays actuate the two corresponding pneumatic valves and thus determine two perforations in the strip of paper which corresponds to the reproduction of the character A at the casting machine. As all the characters and all the marks of the keybank must be identified by the indication of the column and the row at the crossing of which they will be found in the matrix case, to each lowering of a key will correspond the operation of two electromagnets and, consequently, a double characteristic perforation will be produced in the strip of paper.

It is thus understood that these perforations are produced in an extremely easy manner, notwithstanding the considerable number of marks and characters which may be shown at the keyboard. This, however, will only give satisfaction for the simple composing in an ordinary die-case and under condition that the required characters are duly indicated at the keybank and that, moreover, the subsequent printing has to be performed in one single colour.

However, in the matter of typographical composing, it is necessary, mainly in combined arrangements, to be able to work with the casting machine on an extended die-case. Normally, such enlarged case also comprises fifteen rows of matrices, but seventeen columns, which means two supplementary columns arranged at the left of the ordinary division.

In Fig. 5 is shown an enlarged die-case 34. For enabling the casting machine to reproduce the supplementary characters, it is necessary to produce two perforations supplementary to the normal ones. For this purpose, each of the supplementary columns is designated by two characters respectively NI and NL, in such a manner that to each of the aforesaid characteristics identifying the different matrices, i. e., the characters, it can be useful to add the two novel characteristics of the enlarged case. Thus will be put in action simultaneously four electromagnets, i. e., four pneumatic valves, thus producing simultaneously four perforations at each time when a character of one or the other of the two supplementary rows of the enlarged case will be typed.

For producing these two supplementary perforations, use will be made of the two contact strips 25, 26 of each of the keys (Figs. 3 and 20). These strips 25, 26 are adapted to enter into contact with the special terminals 35, which can be moved along two conductors forming supports, respectively designated by the characters NI and NL (Fig. 4). Each of these terminals is intended to close the circuit of two electromagnets, characterizing the position of the characters of the two supplementary rows of the large-sized matrix-case. Now, it will be sufficient to unite these auxiliary conductors to the corresponding strips 32 of the intermediary 27, to enable to secure their connection with the general distributor 33 of the installation, by means of a small-sized switch.

In the diagram of Fig. 3, the left hand conductor of the special terminal 35 is common to the electromagnet N and this conductor is electrically connected to the strip N of the intermediary 27. Similarly, all the conductors N of the contact board will thus be connected to the same strip N. The other conductor of the same special terminal 35 is connected either to the strip I, or to the strip L, according to the supplementary rows of the large-sized die-case under consideration. A convenient switch is inserted between the three aforesaid conductors, for the purpose of rapid working either with ordinary or with extended die-case.

The other contacts of the contact board are connected in the manner disclosed with reference to the diagram of Fig. 4, for instance.

By this arrangement, it may be observed that, the movable contact being arranged at a convenient place, by lowering the corresponding key, there will be simultaneously effected four electric contacts, the two extremes of which are identical to those mentioned previously with reference to Fig. 1, whereas the two others cause the instantaneous operation of the supplementary electromagnets NI or NL, according to the row in which is found the character which has been typed. The compositor has thus all necessary facilities to conform his machine exactly to the requirements of each composing work.

Indeed, by the displacement of the movable contacts along the conductors forming supports, it is possible to transfer, at will and almost instantaneously, any character to one or the other of the two supplementary rows of the large-sized matrix-case.

If, afterwards, the compositor has to work upon an ordinary case, he has only to remove the movable contacts, so that the corresponding characters may occupy their normal place in the ordinary matrix-case.

Thus, by means of simple indications and a material very easy to be managed, it is possible to perform any composing work, as well with ordinary as with large-sized die-case.

The electromagnetic arrangement also permits to comply with all the other conditions of composing upon single-type machines. Namely, the composing with the single-type spacing device requires, for the two rows of justifying keys, besides the normal perforations, two other supplementary perforations which are easily obtained by the same arrangements as those described for working with large-sized matrix-cases.

As indicated in the diagram of Fig. 6, it is sufficient to secure the closing of the circuit of the electromagnets N and K to the top row and N and J to the bottom row. It is thus sufficient to provide for each of the contact cases corresponding to the aforesaid rows of justifying keys, two supplementary contact strips connected to the terminals of the magnets, by means of a convenient switch which permits the interruption and the instantaneous closing of these particular circuits.

Practically, as indicated in Fig. 6, these contact strips are formed from four blades, the two outer of which are common to two superposed rows, whereas the two central blades correspond to each key under consideration.

It is quite clear that, by lowering the justifying keys, the circuits of the different special relays are immediately closed and the corresponding perforations produced.

Furthermore, it should be noticed that the electric conductors issued from the supplementary contact strips NJ, KN, are connected to the strips 32 and the distributor. This determines, moreover, the very useful character of this combination. Indeed, each key of the different rows comprises also four contacts 39, 40, 41, 42, corresponding to the four contact terminals. The two outer strips 39, 40, are intended respectively to indicate the position of the key (I in the example specified), whereas the second (N) is common to all the keys. The two inner strips determine the amount of justifying. Thus for the first row will be brought in circuit the magnets I, .0075, K and N, whereas for the second row will be brought in circuit the magnets I, .0005, J and N. Now, by lowering a red key of one of the two top rows of the keybank, four perforations will be simultaneously produced in the paper strip, and this permits to produce at the casting machine, while using the spacing apparatus, the justifying required by the compositor.

Finally, the invention provides also for the improvement relating to a new arrangement for the composing of type to be printed in two colours. This condition may be complied with as well by the introduction of electromagnet combinations similar to those described herebefore, as by the use of a small mechanical device which can be arranged in the set of control blades of the perforating punches.

The first embodiment consists in determining the closing of convenient circuits by means of movable contacts similar to those used for the composing with large-sized die-cases, considering that it is furthermore necessary to actuate supplementary electromagnets. But, where for the composing with large-sized die-cases, each character transferred to one or the other of the two supplementary rows requires two supplementary perforations, the two-colour composition only requires a single supplementary perforation for each character. Thus, for instance, all the characters of a type to be printed in black require, in the example of Fig. 7, as supplementary perforation, that corresponding to the electromagnet B, whereas all the characters of the type to be printed in red require, as supplementary perforation, that corresponding to the electromagnet A. For this purpose, there is provided in the arrangement for composing with large-sized case, a rapid and easy change in the coupling of the auxiliary blades at the board of magnets. Indeed, it will be sufficient to couple in this latter case all the strips conducting to the magnet N of the large-sized die-case arrangement to the magnet A, whereas the strips I and L (originally connected respectively to the magnets I and L) are firstly connected to each other and then coupled to the magnet B. This arrangement clearly appears in the diagram of Fig. 7.

The supplementary perforations A and B are produced by means of supplementary contacts of special shape, placed in front of the fixed contacts of the contact board. The breaking and the making of the circuit of the apparatus is instantaneously performed by the single manipulation of a small switch.

By this arrangement, the only change to be performed in the matrix case consists in replacing one single row of matrices by blanks, whereas at the casting machine, one of the air tubes ending at the plungers A or B, according to the ulterior colour of printing, should remain obstructed.

Thus, for instance, for the front to be printed in red, the matrices of the fourteenth row, which only comprise italic characters not used in the work under consideration and corresponding to the perforation B, will be replaced by blanks, and the opening of the tube at the casting machine ending at the air pin of the fifteenth row will remain obstructed. Conversely, for the casting of the fount for "black", the blanks of the fourteenth row will be first transferred at the fifteenth and the opening of the tube ending at the air pin B will be closed.

The other operations remain identical to those performed for ordinary type.

For more clearness, it is for instance proposed to cast the type for "red". In this case, the casting machine shall only produce the characters forming part of the type to be printed in this colour, whereas all that corresponds to the "black" type should be cast in the form of blanks absolutely of the same value as the corresponding normal type.

In the casting machine, the aperture ending at the plunger A is obstructed. The action of the additional perforation A obtained at the composing machine with relation to the characters of the type for "red" is eliminated so that the machine casts these characters at their ordinary location within the matrix case. However, as soon as a character forming part of the type for "black" will pass overhead the row of apertures of the paper tower cylinder of the casting machine, the additional perforation B causes the corresponding pneumatic plunger to ascend and perform the casting of a blank in the fourteenth row, of absolutely the same value as the character which it replaces.

The same operation is repeated for each character of the type for "black" which passes over the cylinder.

At the second passage of the same roll in the casting machine, the type for "black" is cast, whereas at the place for the red prints, the machine will only produce blanks. In this way, the marking of the two-colour type is secured in a mathematically accurate manner.

Figures 9, 10:
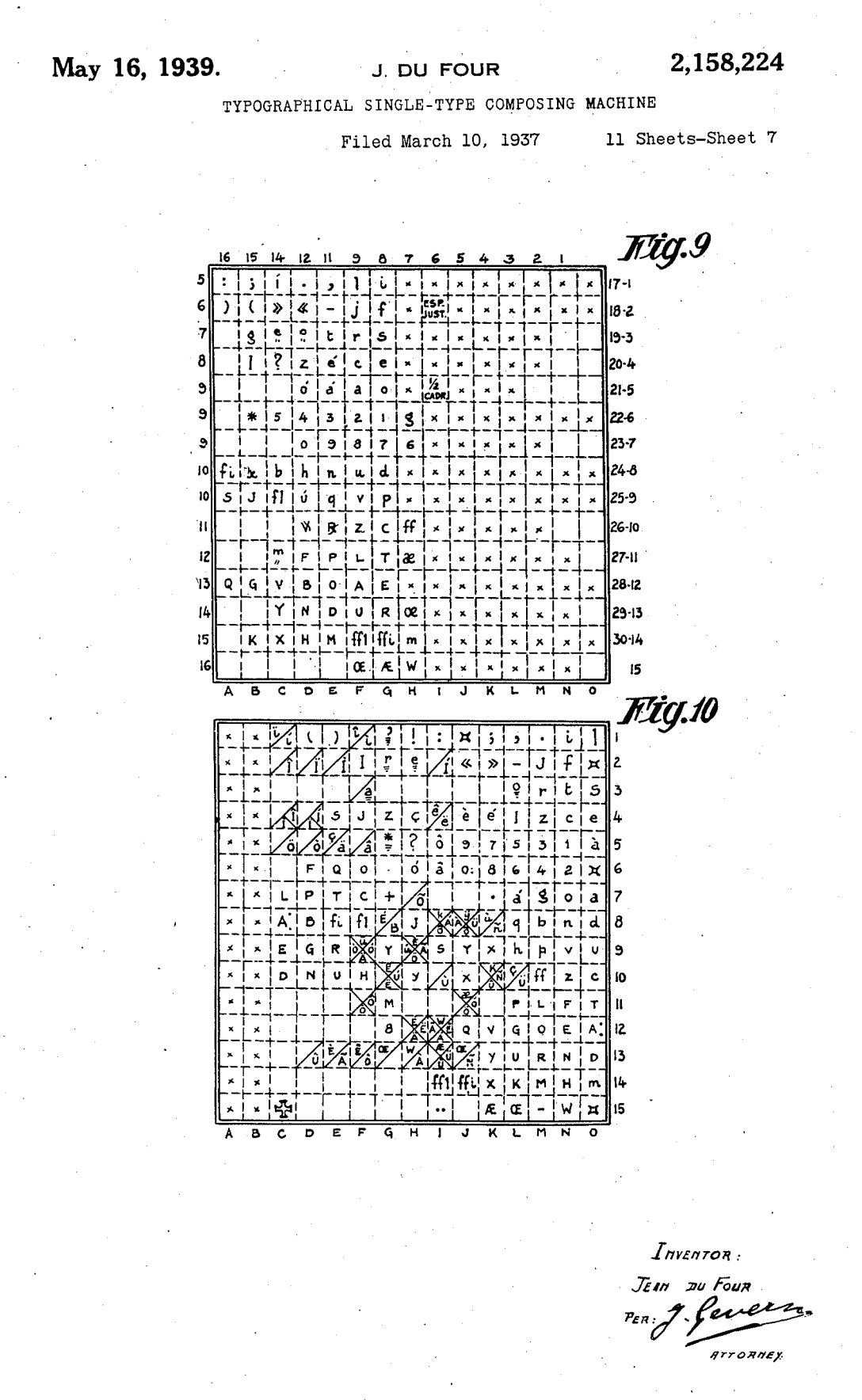

The examination of the Figs. 8, 9 and 10, in which the two former ones illustrate diagrammatically an old die-case and the last one a case according to the invention, permits to immediately understand the considerable simplification and condensation of the device.

The same result may, however, be obtained by the use of a small mechanical apparatus described hereafter and illustrated, in perspective views, in Figs. 11, 12 and 13.

While providing, at the casting machine, for the new directions for the casting of two-colour type as described hereinbefore, it will be sufficient, at the composing machine, to produce for each character a single additional perforation, which varies according to the printing colour.

Now, the mechanism to be inserted in the set of control blades for the perforating punches ought to secure instantaneously, by simple manipulation of the operator, a permutation between the case and the blade controlling the additional perforation, in this case one of the blades A or B.

As illustrated in Figs. 11, 12 and 13, this mechanism is mounted upon a small bracket 44, fixed to the piston block of the key-board by means of screws and two supporting rods 45 and 46.

The apparatus is formed with a small groove pulley 47, freely rotating about a fixing bolt 48, normally fixed in the aforesaid bracket 44. Upon the top face of the groove pulley are loosely mounted two diametrically opposite pivots 49, 50, which are split at the top over a part of their length. These pivots constitute a support for two blades 51, 52, which normally rest upon a rod which is moved in a vertically reciprocating manner by the movement of the keys.

In the example shown, these two blades 51, 52 are thus moved by the rod matriculated *a18KC39* of the single-type key-board, owing to their special connection with the small groove pulley 44. These two blades 51, 52 are adapted to freely follow the movements of said rod *a18KC39*, when the operator moves the keys at the key-board. However, these two blades 51, 52 each present a projection 53, 54, adapted to become engaged underneath the corresponding part respectively of the blades A and B controlling the punch corresponding to the beforementioned additional perforations. Normally, these projections 53, 54 are outside the operative field of said blades A and B. For bringing them in active position, it is necessary that the operator moves a convenient element. For this purpose, the groove pulley 44 is for instance drawn towards the left by a return spring 55, whereas a cable 56 of the Bowden type, for instance, connects said pulley 44 to a manipulation knob 57. The cable and the oppositely acting spring are normally steadied for keeping said pulley 44 in the required position and, consequently, also the auxiliary blades 51 and 52. For this purpose, the knob 57 is provided with a stud 58, guided in a sleeve 59. The latter has three notches of different depth, respectively 60, 61 and 62. Furthermore, the stud 58 has a sideward projection 63, which becomes easily engaged in said notches. Now, according to said projection being engaged in one of the notches, the cable will be more or less released and the groove pulley 44 will assume a determined position. According to this position, the auxiliary blades 51, 52 will become clutched or not with the blades A, B, controlling the additional perforations.

The manipulation knob 57 is close at hand for the compositor. Consequently, according to the type having to be printed in black and in another colour, red for instance, or to the type having to be printed in one single colour, it will be sufficient to exert a slight traction upon said knob 57 and to engage the projection 63 in the notch corresponding to the work to be produced.

Fig. 11 illustrates the apparatus in retracted position, which means for composing an ordinary one-colour text. It is to be noticed that the projections 54, 55, respectively of the blades 51, 52, are outside the control blades A, B.

Fig. 12 illustrates the apparatus in a position in which the auxiliary blade 52 is in engagement with the control blade B.

Finally, Fig. 13 shows the third position of the device, namely the blade 51 in engagement with the control blade A. As a consequence, the required additional perforation will be easily performed while composing for two colours, provided, however, that the beforementioned conditions for the casting at the casting machine are complied with.

The invention furthermore relates to particular embodiments of variable portions of the arrangement, for the purpose of making them more efficient and of simple construction.

A first constructional feature relates to the arrangement of the electromagnets underneath the keybank and the contact board, as also to the arrangement of the set of control blades for the pneumatic valves. This arrangement is diagrammatically shown in Fig. 14.

According to this arrangement, the electromagnets are grouped in a board of small encumbrance, and the different blades are shaped so as to finally produce a set of parallel duly guided rods 64. The setting of the different rods in their initial position is performed by means of a common abutment formed by a transverse bar pivotally mounted and brought back to its initial position by means of one or two elastic elements, such as helical springs.

Figure 14:
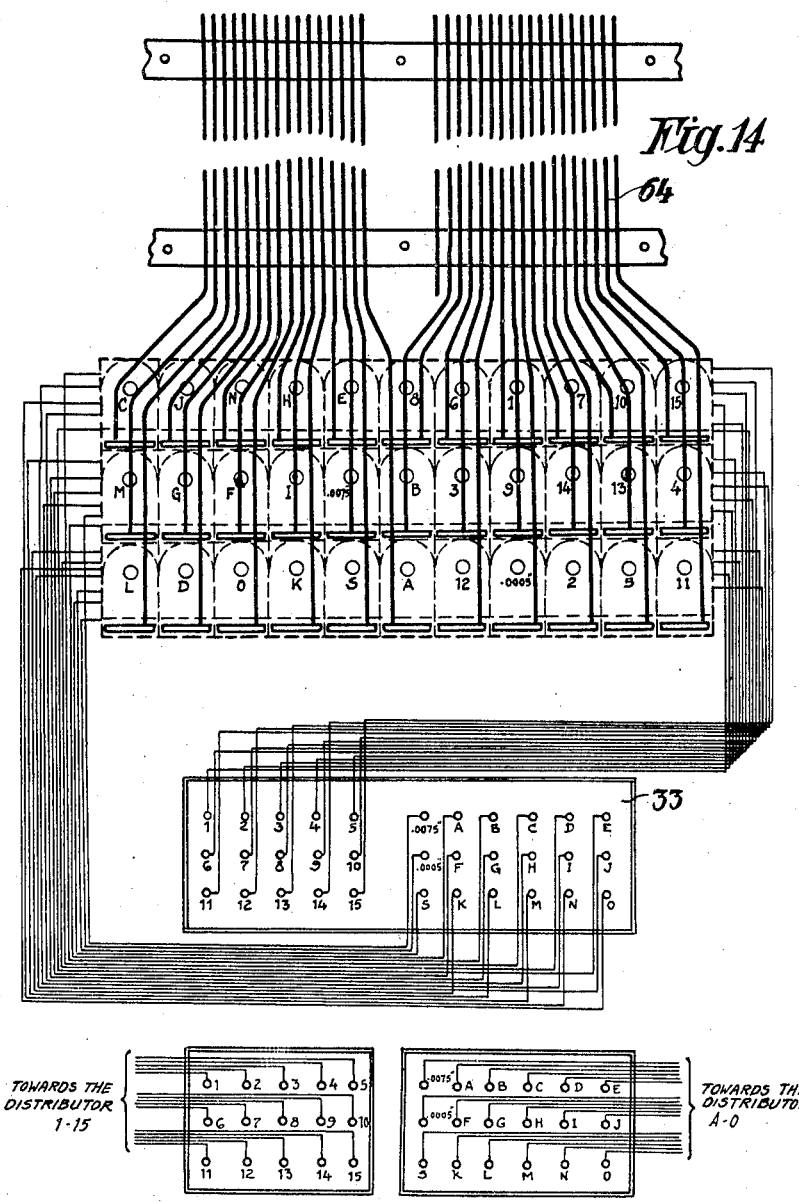
Fig. 14 illustrates diagrammatically the arrangement of the thirty-three relays and operating rods for the pneumatic valves.

With reference to Fig. 14, the installation is characterized by a distributor 33, in which the contacts are grouped in two zones, as previously described. This is particularly useful for securing the electric connections and disconnections.

The whole of the arrangement illustrated in Fig. 14 presents all facilities for securing the numerous electric contacts connecting the different elements.

Particular conditions are also preferable in the embodiment of the movable contact supports. As illustrated in Figs. 15, 17 and 18, these contact supports are formed from a strip 65, which has been longitudinally folded, so as to give a double thickness. On the edge of this double strip are placed the contacts 66 which, for this purpose, present an axial notch.

Furthermore, the plug supporting blade may be constructed in a simple manner, as illustrated in Fig. 18. All the plugs 67 are fixed upon a common blade 68. The latter is traversed by threaded rods 69, forming for instance an extension of certain of the plugs 67. These threaded rods are used for easily fixing the blade and can also be used as a terminal for connection with the electric conductors.

Fig. 19 illustrates, in vertical section, a spring-controlled contact easily to be constructed although securing a perfect contact. With reference to this Fig. 19, the spring-controlled contact comprises a bolt 70, provided with a head 71, in the shape of a socket, for the introduction of the spring 74. The other end of the bolt is provided with a threaded portion 72, useful for fixing the element to the electric connection of the circuit. Upon the head 71 is adjusted a cap 73. Intermediate the head 71 and the bottom of the cap 73 is interposed the helical spring 74 imparting elasticity to this contact.

The invention relates furthermore to the particular structure of the key levers, which are combined with a plurality of contact blades, for the purpose of determining the closure of the different circuits, according to the nature of the composing.

Fig. 20 gives a perspective view of such improved lever.

The key lever 75 is mounted upon a sleeve 76. All the sleeves of the same row are traversed by a common wire forming shaft of rotation. The same sleeve 76 is integral with four strips 77, 78, 79 and 80, and each of them is ended, at its free end, by a small contact terminal of convenient metal.

It results from this arrangement that the lowering of a key causes systematically the swinging of the four contact strips. The keys are brought back to their normal position by any elastic element.

It is understood that the different elements described hereinbefore, as also the different combinations disclosed may undergo numerous modifications, as well to the shape of their constitutive parts as in their relative disposition. Furthermore, the different conditions disclosed hereinbefore may be used separately or in combination with each other or with other conditions capable of producing the same result.

I claim:

1. In a single-type composing machine comprising a perforating mechanism controlled by means of pneumatic valves and a keybank, the combination of electromagnets with electric circuits controlled by the depression of the keys at the keybank for actuating the pneumatic valves.

2. In a single-type composing machine comprising a perforating mechanism controlled by means of pneumatic valves and a keybank, the combination of electromagnets with electric circuits and a number of contacts involved with said circuits and arranged in accordance with the number of keys at the keybank and controlled thereby.

3. In a single-type composing machine comprising a perforating mechanism controlled by means of pneumatic valves and a keybank, the combination of electromagnets with electric circuits, a contact board underneath the keybank and having a number of contact sets in accordance with the number of keys, each contact set comprising three pairs of contacts, and means for shifting the keybank in three different positions for the purpose of controlling successively a series of contact sets by depressing the keys at the keybank.

4. In a single-type composing and casting machine comprising a perforating mechanism controlled by means of pneumatic valves, a keybank and a matrix case at the casting machine, the combination of a number of electromagnets corresponding to the number of columns and of rows of said matrix case, and a number of electromagnets for actuating the pneumatic valves involved with particular functions with electric circuits controlled by the depression of the keys.

5. In a single-type composing and casting machine comprising a perforating mechanism controlled by means of pneumatic valves, a keybank and a matrix case at the casting machine, the combination of a number of electromagnets corresponding to the number of columns and of rows of said matrix case, a number of electromagnets for actuating the pneumatic valves involved with particular functions with electric circuits, contacts inserted in said circuits and controlled by the depression of the keys, and intermediaries formed by two connection boards, the one supporting all the electric connections relating to the matrix case column and the other all the connections relating to the matrix case rows, the common connections being grouped on said intermediaries for reducing the number of electric circuits to that of the columns and rows of the matrix case.

6. In a single-type composing and casting machine comprising a perforating mechanism controlled by means of pneumatic valves, a keybank and a matrix case at the casting machine, the combination of a number of electromagnets corresponding to the number of columns and of rows of said matrix case, a number of electromagnets for actuating the pneumatic valves involved with particular functions with electric circuits, contacts inserted in said circuits and controlled by the depression of the keys, intermediaries formed by two connection boards, the one supporting all the electric connections relating to the matrix case columns and the other all the connections relating to the matrix case rows, the common connections being grouped on said intermediaries for reducing the number of electric circuits to that of the columns and rows of the matrix case, and a distributor board electrically connected, on the one hand to said connection boards by means of removable conductor cords, and on the other hand to the electromagnets actuating the pneumatic valves.

7. In a single-type composing and casting machine comprising a perforating mechanism controlled by means of pneumatic valves, a keybank and an extended matrix case at the casting machine, the combination of electromagnets with electric circuits controlled by the depression of the keys, and a contact board underneath the keybank having fixed contacts in accordance with the normal-sized matrix case and removable contacts in connection with the additional rows of the extended matrix case for the purpose set forth.

8. In a single-type composing and casting machine comprising a perforating mechanism controlled by means of pneumatic valves, a keybank and a spacing apparatus with two rows of justifying keys, the combination of four electromagnets with electric circuits controlled by the depression of the justifying keys.

9. In a single-type composing and casting machine comprising a perforating mechanism controlled by means of pneumatic valves, a keybank and a matrix case at the casting machine, the combination of electromagnets with electric circuits controlled by the depression of the keys and a contact board underneath the keybank having fixed contacts in accordance with the matrix case and removable contacts in accordance with an auxiliary electromagnet adapted to produce the required punch for casting the necessary blanks, substantially as set forth.

10. In a single-type composing and casting machine comprising a perforating mechanism controlled by means of pneumatic valves, a keybank and a matrix case at the casting machine, the combination of electromagnets with electric circuits controlled by the depression of the keys and a contact board underneath the keybank having fixed contacts in accordance with the matrix case and an auxiliary mechanism actuated by the operator for producing the supplementary punch adapted to produce blanks in the cast.

11. In single-type composing machines, a supplementary pneumatic valve at the perforating mechanism for producing particular punches adapted to produce blanks at the casting machine, a pair of auxiliary rods operating said valve, a pair of blades pivotally fixed in diametrically opposite arrangement upon the side of a pulley the angular position of which is controlled by hand, the arrangement being such that one or the other of the blades is clutched with one or the other of the auxiliary blades in determined positions of the pulley, for the purpose of actuating one of the auxiliary blades.

12. In single-type composing machines, a supplementary pneumatic valve at the perforating mechanism for producing particular punches adapted to produce blanks at the casting machine, a pair of auxiliary blades operating said valve, a pair of blades pivotally fixed in diametrically opposite arrangement upon the side of a pulley the angular position of which is controlled by a Bowden cable and stepped handle knob cooperating with a notched sleeve, the arrangement being such that one or the other of the blades is clutched with one or the other of the auxiliary blades in determined positions of the pulley, for the purpose of actuating one of the auxiliary blades.

13. In a single-type composing machine of the type set forth, a contact board and a connection board with extensible contacts, each formed by a pair of telescoping sockets enclosing a helical spring, one of the sockets being fitted with fixation means, substantially as described.

14. In a single-type composing machine of the type set forth, a contact board, the use of keys at the keybank, the key lever being integral with a plurality of conductor strips simultaneously moved by the depression of the keys.

JEAN DU FOUR.